Patented July 23, 1946

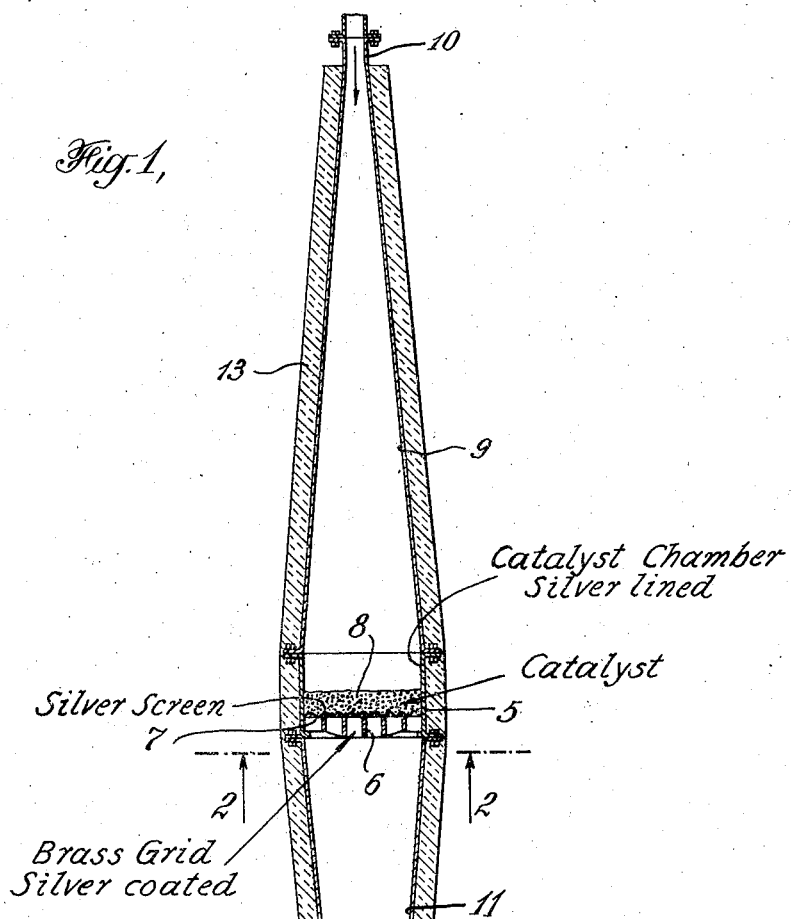
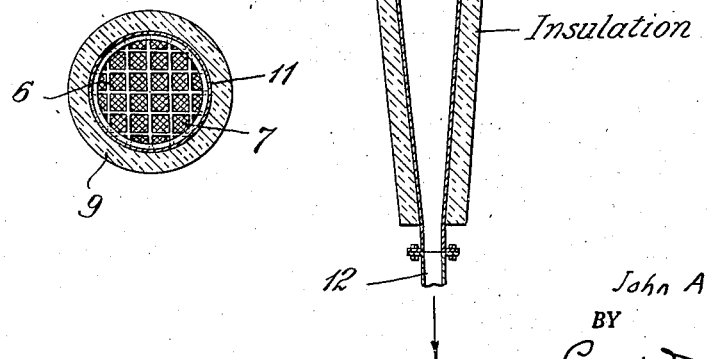

2,404,574

UNITED STATES PATENT OFFICE 2,404,574

APPARATUS FOR CATALYTIC OPERATIONS

John A. S. Hammond, Glenbrook, Conn., assignor to U. S. Industrial Chemicals, Inc., New York, N. Y., a corporation of Delaware Application November 30, 1943, Serial No. 512,390

4 Claims. (Cl. 23—288)

This invention relates to apparatus for catalytic operations particularly those in which a gaseous phase is passed through a shallow catalyst bed to effect the desired reaction.

In an application Ser. No. 509,124, filed November 5, 1943, Frederick R. Balcar has described a method of producing acetaldehyde by oxidation of ethyl alcohol in which a preheated mixture of ethyl alcohol vapor and air is passed through a shallow catalyst bed consisting of massive silver in the form of short rods having spacing means integral therewith at a temperature of 300–400° C. The apparatus hereinafter described is particularly adapted to facilitate the operation of the Balcar method. It is, however, equally applicable and useful in other catalytic operations of a similar nature in which the gaseous phase passes through a shallow catalyst bed. Where the catalyst bed is relatively shallow, that is of the order of two inches in depth, the catalyst offers relatively little resistance to the flow of gas, and there is therefore very little pressure drop across it. Thus, in the operation described in the Balcar application, the difference in pressure between the upstream and downstream flows of gas is equivalent to about 10 inches of water or even less. Because of the low pressure drop, inequalities of flow over portions of the bed may be established with resulting detriment to the efficiency of the operation.

If the rate of gas flow varies materially through different portions of the catalyst bed, those portions of the catalyst which are subjected to increased rates of flow may become inactive due to the fact that the reaction zone has advanced so close to the lower surface of the catalyst bed as to be incapable of supporting further combustion. The temperature of the remaining portions of the bed will not be materially increased since the temperature is limited by the composition of the inlet gas. The conversion is very considerably lowered and the yield may also be decreased. If the areas of increased flow increase substantially in their relation to the area of the entire catalyst bed, the reaction may cease entirely, due to the cooling effect of the gases which do not react, since the degree of preheat is generally considerably below the temperature required to initiate and maintaining the reaction.

It is essential that the downstream as well as the upstream flow of gases be uniform. Any non-uniformity of downstream flow will in turn influence the pressure drop through the catalyst bed and cause a non-uniform flow therethrough. It is evident, therefore, that to maintain continuous and satisfactory operation, the flow must be uniform on both sides of and through the catalyst bed.

It is the object of the invention to provide a simple and effective apparatus which ensures uniform flow of the gaseous phase to, through and from the catalyst bed and consequent improvement in the efficiency of the reaction.

Other objects and advantages of the invention will be apparent as it is better understood by reference to the following specification and accompanying drawing, in which Fig. 1 is a longitudinal section through an apparatus embodying the invention; and Fig. 2 is a section on the line 2—2 of Fig. 1.

I have discovered that uniform flow of a gas through a shallow catalyst bed can be established and maintained satisfactorily, in spite of a relatively low pressure drop, if the inlet and outlet connections to the catalyst bed are of conical shape having the proper dimensions. To secure the desired result, the length of the cone on each side of the catalyst bed should be at least five times the diameter of the catalyst bed. Thus, for example, with a bed 18 inches in diameter, the two cones on opposite sides thereof should be approximately 7 feet long, to secure the best results. Obviously some variation from these dimensions is possible, particularly if the full advantages of the invention are not considered essential. In general, the invention rests upon the fact that by employing a conical inlet and a conical outlet of substantial length, the flow of gas to and from the catalyst bed and through the bed is maintained at a substantially uniform rate, even though the pressure drop is relatively slight. As a result, inequalities of flow through the catalyst bed are avoided and the efficiency of the operation is maintained. Measurements with a Pitot tube have demonstrated the effectiveness of the apparatus in securing the desired uniformity of flow throughout the path of travel of the gases.

Referring to the drawing, 5 indicates a catalyst chamber which is preferably circular in cross-section. It is provided with a grid 6 which supports a screen 7 carrying a shallow bed 8 of the catalyst, for example the silver rivets as described by Balcar. Other catalysts may be employed to facilitate various catalytic reactions in the gaseous phase.

At the inlet end of the chamber 5, a cone 9 is mounted. As indicated, the cone is of substantial length compared with the diameter of the catalyst chamber. It is connected to a pipe 10 through which the gas preheated to the desired temperature is introduced.

On the opposite side of the catalyst chamber a similar cone 11 is secured and connected to a pipe 12 through which the gaseous products are withdrawn. The chamber 5 and the cones 9 and 11 may be surrounded by suitable insulating material 13. In the apparatus as described, the entering gas flows at a uniform rate through the cone 9 and the catalyst 8 and thence through the cone 11 to the outlet pipe 12.

The apparatus may be constructed of suitable material, depending upon the particular reaction involved. It should, of course, be of such material as not to affect the reaction. For the production of acetaldehyde from ethyl alcohol, the chamber 5 is preferably made of brass or stainless steel, which should be coated with silver in the form of a sheet or by electroplating or spraying. The inlet cone 9, which is at relatively low temperature, may be made conveniently of copper or brass. The outlet cone 11, being at higher temperature, is preferably made of brass. The grid 6 is also conveniently made of brass, which should be coated with silver. I prefer to make the screen 7 of silver. These details concerning materials are merely by way of example in an apparatus intended to improve the efficiency of a particular operation. Any material may be used which will withstand the temperatures and is innocuous with respect to the entering gases and the products of the reaction, or, in other words, do not interfere with the intended reaction which is effected by the catalyst used.

The dimensions may vary widely, depending upon the contemplated reaction. For the purpose of converting ethyl alcohol to acetaldehyde, the catalyst chamber 5 may have an internal diameter of 18 inches and may be approximately 12 inches in length. The two cones 9 and 11 are each approximately 7 feet in length, tapering from the diameter of the reaction chamber to a diameter of about 4 inches. Such an apparatus is highly efficient in the catalytic conversion of ethyl alcohol to acetaldehyde and, as indicated, the principles may be applied to similar catalytic operations.

Various changes may be made in the details of construction, the materials used and the dimensions without departing from the invention or sacrificing the advantages thereof.

I claim:

1. In an apparatus for gaseous phase catalytic operations, a catalytic zone of substantially uniform cross-sectional area and of relatively narrow height arranged to receive a relatively shallow catalyst bed, means to support said catalyst bed in said zone, and conduits having portions substantially uniformly conical extending from the catalyst zone on both sides thereof, the cone shaped portions of said conduits being of substantially the diameter of the ends of the catalytic zone at their bases and approximately five times said diameter in length.

2. In an apparatus for gaseous phase catalytic operations, a catalytic zone of substantially uniform cross-sectional area and of relatively narrow height arranged to receive a relatively shallow catalyst bed, a silver coated grid and a screen to support said catalyst bed in said zone, and conduits having portions substantially uniformly conical extending from the catalyst zone on both sides thereof, the cone shaped portions of said conduits being of substantially the diameter of the ends of the catalytic zone at their bases and approximately five times said diameter in length.

3. In an apparatus for gaseous phase catalytic operations, a silver lined catalytic zone of substantially uniform cross-sectional area and of relatively narrow height arranged to receive a relatively shallow catalyst bed, means to support said catalyst bed in said zone, and conduits having portions substantially uniformly conical extending from the catalyst zone on both sides thereof, the cone shaped portions of said conduits being of substantially the diameter of the ends of the catalytic zone at their bases and approximately five times said diameter in length.

4. In an apparatus for gaseous phase catalytic operations, a catalytic zone of substantially uniform cross-sectional area and of relatively narrow height arranged to receive a relatively shallow catalyst bed, means to support said catalyst bed in said zone, and conduits of non-ferrous metal having portions substantially uniformly conical extending from the catalyst zone on both sides thereof, the cone shaped portions of said conduits being of substantially the diameter of the ends of the catalytic zone at their bases and approximately five times said diameter in length.

JOHN A. S. HAMMOND.